United States Patent [19]

Gössl et al.

[11] Patent Number: 4,706,545
[45] Date of Patent: Nov. 17, 1987

[54] BRAKE VALVE INFINITELY VARIABLE PRESSURE INTENSIFICATION

[75] Inventors: Dietmar Gössl, Gössenheim; Ludwig Muncke; Kurt Wittich, both of Lohr, all of Fed. Rep. of Germany

[73] Assignee: Mannesmann Rexroth GmbH, Fed. Rep. of Germany

[21] Appl. No.: 788,074

[22] Filed: Oct. 16, 1985

[30] Foreign Application Priority Data

Nov. 9, 1984 [DE] Fed. Rep. of Germany ....... 3441048

[51] Int. Cl.⁴ ............................................. F15B 13/04
[52] U.S. Cl. ............................................ 91/32; 91/434; 91/460; 60/555; 137/85
[58] Field of Search ...................... 91/32, 33, 434, 460; 60/555; 137/85

[56] References Cited

U.S. PATENT DOCUMENTS

| | | | |
|---|---|---|---|
| 2,720,954 | 10/1955 | Pratt | 60/555 X |
| 2,898,929 | 8/1959 | Williams | 137/85 |
| 3,094,843 | 6/1963 | Martin | 60/555 X |
| 3,698,414 | 10/1972 | Nagata et al. | 137/85 |

Primary Examiner—Robert E. Garrett
Assistant Examiner—Mark A. Williamson
Attorney, Agent, or Firm—Ostrolenk, Faber, Gerb & Soffen

[57] ABSTRACT

In a brake valve of the type in which a given ratio is maintained between a master pressure developed by a brake pedal and an actual brake pressure, an arrangement is provided for continuous, rather than stepwise, adjustment of this ratio. The brake valve includes a control piston which is subjected to the master pressure and which, by the displacement thereof, opens and closes connecting channels between an accumulator containing a primary pressure fluid and a brake, as well as between the brake and a fluid collecting tank. The control piston and a measurement piston apply counter forces to the arms of a balance beam whose lever ratio determines the degree of feedback of the instantaneous brake pressure to the control piston. A stop is provided in the path of the axis of the control piston, which limits the stroke of the piston, to prevent the overloading of the balance beam during abnormally high braking pressures such as occur, for instance, during panic braking.

15 Claims, 2 Drawing Figures

BRAKE VALVE INFINITELY VARIABLE PRESSURE INTENSIFICATION

BACKGROUND OF THE INVENTION

The present invention relates to a brake valve and more specifically to a brake valve with a controllable intensification device for controlling the pressure ratio between a master pressure supplied by a brake pedal and a braking pressure developed in a brake.

The brakes of a vehicle assembly, consisting of a tractor hitched to one or more trailers, must be adapted to one another so that no substantial hitch forces are produced between the individual units of the vehicle. A standard has been established for coupling different vehicles of any manufacture which provides that a brake pressure of 100 bar present on a hydraulic coupling must produce a 30% braking of the vehicle.

Brake valves are known in which a control piston and a measurement piston are arranged one behind the other in a borehole so that respective end surfaces of each are in contact. The other end surface of the control piston is subjected to an input pressure generated by a brake pedal of the tractor while a resulting pressure which builds in the trailer brake is fed back and applied to the other end of the measurement piston. The application of the input pressure to the control piston displaces both pistons which are designed to thereby establish a channel between pressure fluid lines of the trailer brake and a source of hydraulic fluid under pressure until an equilibrium condition is attained.

Since the pressure applied to the brake of the trailer is to be proportional to the input pressure developed by the tractor, the surface areas of the pistons must be appropriately proportioned to achieve the required pressure ratio. Quite obviously, to change the pressure ratio, the diameter of the master piston must be changed, entailing an expensive undertaking. Furthermore, the absorption volume of the master piston is undesirably dependent on the set intensification ratio since it is a function of the diameter of the master piston. In order to maintain a small absorption volume, and also avoid the undesired effects resulting from the dependency of the shape of the master piston on the absorption volume, the stroke and diameter of the control piston must be kept to a minimum.

This leads to high manufacturing costs and/or to high leakage values due to the small overlap between the control edges in the housing and the circumferential surface of the control piston upon the opening and closing of the corresponding channels.

Federal Republic of Germany Application DE-OS 29 38 978 discloses a brake valve for controlling the brake pressure on a trailer wherein the brake is acted upon by a primary pressure from an accumulator. This pressure control relies upon the buildup or relief of the pressure taking place via a control piston whose one end surface is acted on, not only by a spring but also by the brake pressure fed back at the same time. In parallel to the control piston there is arranged a servopiston, one end surface of which is subjected to a master pressure from a brake pedal and which transmits this pressure in the form of a force to one lever arm of a double-armed lever which operates as a balance beam. The other lever arm applies the force, appropriately intensified, to the other side of the control piston. In this manner, for every master pressure, i.e. pressure supplied by the brake pedal, there is established for a certain master pressure a corresponding brake pressure which is supplied to the trailer and which is proportional to the master pressure in accordance with the leverage ratio. In this arrangement the balance beam is acted upon by the full master pressure. This pressure, in the event of panic braking, may equal 4 to 5 times the normal operational pressures. The balance beam must, therefore, be designed to meet these rarely occurring maximum pressures.

SUMMARY OF THE INVENTION

It is an object of the invention to provide a brake valve with an infinitely adjustable pressure ratio using a balance beam having a strength and dimension to withstand only normal operational pressure values.

It is a further object of the invention to provide a parking brake which is infinitely adjustable and which can be released without influencing the operation of the control piston, to avoid a large control hysteresis.

These and other objects are achieved in accordance with the present invention as follows. Since the control piston is acted upon by the master pressure and its stroke is limited by a stop member, abnormal pressures applied to the control piston are taken up by the stop member so that the balance beam is relieved of these forces which result from abnormal braking conditions. Consequently, the balance beam need only be dimensioned to withstand the force moment generated during normal maximum braking pressure.

In a further embodiment a parking-brake piston is provided. The control piston is freed from the task of carrying out this function so that it can be designed solely for the function of brake operation via the master pressure. As a result, large frictional forces on the control piston are avoided, eliminating a high control hysteresis. The parking brake piston need be developed only for the function of operating the parking brake. Therefore, it can be coupled in a structurally simple embodiment to a displacement or adjusting device. The displacement device, because it is coupled solely to the parking-brake piston, permits a simple, very small adjustment, i.e. continuous adjustments of the parking-brake pressure. A coaxial arrangement of the pistons enables the easy provision of joint or common flow paths for the two different functions, namely, parking braking and braking via the master pressure. Thus, the entire brake valve has a compact construction.

A coupling of the displacement device of the parking-brake piston has a manually actuated pull rod which makes the brake valve adaptable for coupling of vehicles which require the brake coupling members to be under no pressure while being coupled to one another. The pull rod permits short-time relief of the pressure prevailing in the brake line, which pressure automatically builds up again to the previously adjusted pressure upon the release of the pull rod.

BRIEF DESCRIPTION OF THE DRAWINGS

An embodiment of the invention will be explained below with reference to the drawings, in which.

DETAILED DESCRIPTION OF THE DRAWINGS

Figure 1:
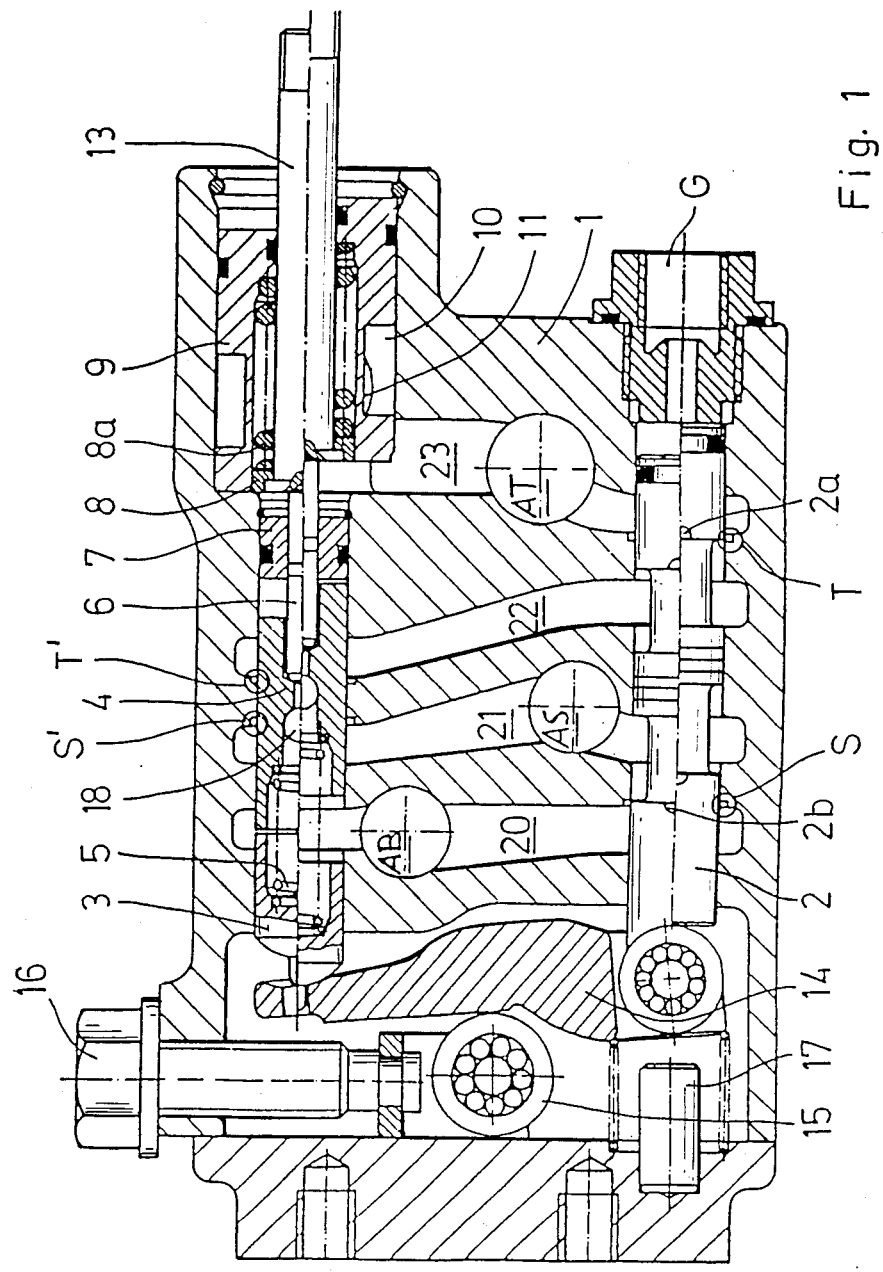
FIG. 1 is a longitudinal section through the brake valve of the invention.

In FIG. 1 the brake valve is shown in two extreme operating positions. The pistons are divided in the drawing along their center lines and are depicted in these two positions. (In the following description, the terms "bottom, top, left, right" refer to FIG. 1.) The position below the center line will be referred to as "position A" and that above the center line as "position B".

Two parallel boreholes are provided in a housing 1. The bottom borehole accommodates a control piston 2, one of the end surfaces of which is subjected to a master pressure supplied by a brake pedal via a connection G. The piston 2 is sealed off behind the end surface. Within an upper borehole there are slidingly arranged a measurement piston 3 and a parking-brake psiton 4 which are forced apart by a control spring 5 which is contained within the hollow interior of the two pistons. The hollow interior within the parking-brake piston 4 extends over its entire length and contains in one end region thereof a pressure-intensification piston 6 associated with the parking brake. Since the piston 6 is not sealed within the hollow interior, the same pressure appears on both end surfaces of the parking-brake piston 4 and this piston is thus pressure-compensated.

Figure 2:
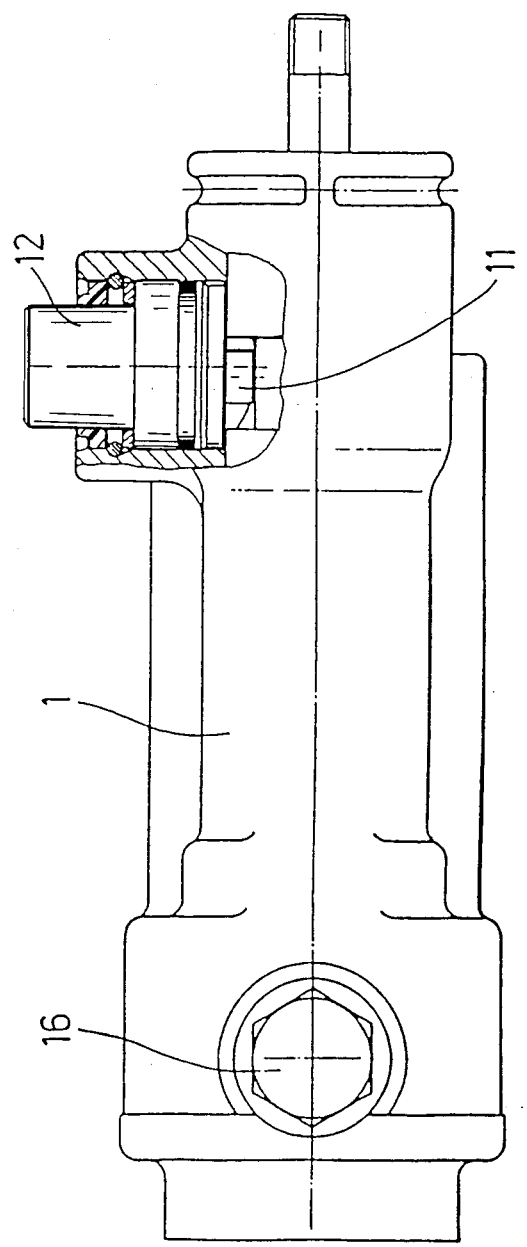
FIG. 2 is a top view of the brake valve of FIG. 1.

The pressure intensification piston 6 is guided in sealed fashion in a fixed bushing 7 which is sealed in the borehole and it is firmly attached to a spring plate 8. The spring plate 8, together with a spring 8a, are contained in an inner bore of an eccenter actuated piston 9 which is slidably mounted in a widened portion of the upper borehole in the housing and sealed therein. The eccenter actuated piston 9 has an annular groove 10 in which a pin 11 of an eccentric shaft 12 (FIG. 2) is engaged. Thereby the eccenter actuated piston can be displaced by rotation of the shaft 12. The spring plate 8 is furthermore firmly connected to a pull rod 13 which extends, for actuation purposes, out of the housing 1 through the eccentric piston 9.

The other ends of the control piston 2 and of the measurement piston 3 abut first and second ends, respectively, of a balance beam 14 which operates in the manner of a dual-arm lever whose fulcrum is provided by a roller in the form of a ball bearing 15. The ball bearing 15 is displaceable by a suitable mechanism, for example a screw 16, along the balance beam (vertically in relation to FIG. 1), whereby the lever ratio of the beam is continuously adjustable so that an infinite number of fulcrum points are provided.

The two extreme positions of the balance beam are determined, on the one hand, by a stop 17 and, on the other hand, by the control piston which rests against a plug located adjacent the connection G. The stop 17 is provided along the axis of the action of the force of the control piston 2 so that the balance beam is not stressed in flexure by the applied abuttment forces.

The two boreholes in the housing 1 are connected by four channels 20 to 23 which extend substantially in parallel to each other and which are opened, closed, or connected to each other by the pistons. For this purpose, each of the boreholes in the housing has two control edges, designated T and S for the lower borehole and T' and S' for the upper borehole. The channel 20 has a connection AB which connects this channel to a pressure pipe, while the channel 21 has a connection AS which connects this channel e.g. to an accumulator which contains a primary pressurized hydraulic fluid or to a pump which supplies the brake with the primary pressure fluid. Similarly, the channel 24 has a connection AT which connects it to an unpressurized collecting tank (AT) in which hydraulic fluid is stored.

The operation of the brake valve is as follows. Starting at position A, the control piston 2 is subjected to the master pressure applied at the connection G and is thereby moved to the left. Thus the connection path, produced by the control edge T and a notch 2a in the shoulder of the control piston 2, between the channel 22 and the tank (at AT) is interrupted whereupon the brake is immediately connected to the primary pressure supplied from accumulator (AS) (position B) through the control edge S and a notch 2b in another shoulder of the control piston 2. The accumulator AS provides braking power to the brake. The pressure which builds up in the brake acts through the connection AB on the end surface of the measurement piston 3. When this pressure reaches a value proportional to the master pressure developed by the brake pedal, it moves the measurement piston 3 towards the left. As a result, the control piston 2 is pushed back via the balance beam 14 toward a central position in which the channel 20 is separated from the channel 23.

This central position, in which the control edges T and S are closed, is referred to as the positive overlap position. The proportional factor between the master pressure and the brake pressure is determined by the point at which the control piston is moved back by the balance beam or the equilibrium of forces acting thereon, i.e. by the lever ratio of the balance beam 14. Since this lever ratio is infinitely adjustable by adjusting the position of ball bearing 15, the proportionality between the master pressure and the brake pressure is also continuously, rather than stepwise, adjustable. As a result, different brake pressures can be set while using the same master pressure.

Upon release of the brake pedal and the consequent decrease in the master pressure, the brake pressure pushes the measurement piston completely to the left and the control piston 2 completely to the right (position A). As a result, the braking pressure is discharged through the path formed by the channel 22 via the hollow space of the parking-brake piston 4 and through the transverse borehole 18 and the control edge T', as well as via the connection established by the control piston 2 between the channel 22 and the tank AT.

In this mode of operation, namely "braking via the master pressure," the parking-brake piston 4 does not move and remains at its right-hand position (position A). It serves at this point for establishing the flow paths necessary for relieving the pressure in the brake, i.e. the pressure in the channel 20 is propagated via the parking-brake piston 4 into the channel 22.

To actuate the parking brake of the tractor/trailer vehicle, which keeps the vehicle in a locked standstill position, the eccentric shaft 12 is turned to thereby move the eccenter actuated piston 9. Since no pressure is present in this case at the connection G, the control piston 2 remains at rest against the plug of the connection. Starting from position A, the eccenter actuated piston is, however, pushed to the left, as a result of which the spring plate 8, due to the force of the spring 8a, is moved, together with the pressure intensification piston 6, towards the left. This also displaces the parking-brake piston in the same direction.

Consequently, the channel 22 is first of all separated from the transverse borehole 18 via the control edge T' and as a result the tank connection previously provided through the control piston 2 is interrupted. Thereupon the transverse borehole 18 establishes a path via control edge S' into the channel 21 so that the brake is connected to the accumulator AS via the hollow interior of the measurement piston 3 and parking-brake piston 2. The primary pressure supplied from the accumulator AS causes the brakes to be applied.

The braking pressure which builds up acts on the end surface of the pressure-intensification piston 6 and thus displaces it in a direction opposite to the spring 8a. At the same time, the parking brake piston 4, which is not subjected to the forces supplied by the hydraulic fluid because it is surrounded by the fluid, follows the pressure intensification piston 6 as a result of the force of the control spring 5 until an equilibrium of forces is established.

Since the initial tension of the spring 8a is determined by the angle through which eccentric shaft 12 is turned, a braking pressure which is proportional to this angle is established. This follows because when equilibrium is reached the connection between brake and the accumulator is interrupted again via the control edge S'. The brake is released by turning the eccentric shaft backwards. As a result the initial tension supplied by the spring 8a is reduced so that the pressure from the brake pushes the pressure-intensification piston 6 towards the right and makes it possible for the parking-brake piston 4 - driven by the control spring 5 - to follow along. Thus, the brake is reconnected to the channel 22 which is in communication with the unpressurized tank (AT) via the control piston 2. This causes a complete relaxing of the brake pressure and the brake is released.

While connecting the actuated brakes of a trailer to its tractor, the connecting line between them must be pressure free. In accordance with the invention, this can be effected by a pulling on the pull rod 13. This causes the pressure-intensification piston 6 to move to the right against the force of the spring 8a and thereby allows the parking-brake piston 4 to follow along. Consequently, just as with the eccentric shaft, the brake pressure is relieved via channel 22 and a pressure free coupling is provided. After attachment of the trailer the pull rod is released. The parking brake piston moves again to the left due to the force of the spring 8a and thereby opens the control edge S' via its transverse borehole 18, as a result of which the accumulator again supplies the brakes with hydraulic fluid to repressurize them again. The pressure which builds up displaces the parking-brake piston 4 again towards the right until equilibrium is established and the accumulator connection is interrupted. Since the setting of the eccentric shaft was not disturbed by the coupling procedure, the same braking pressure is reestablished.

There has been disclosed a brake valve having a ratio between an applied master pressure and a resulting brake pressure which is continuously, rather than step wise, adjustable. It includes a control piston 2 which is subjected to the master pressure and which, through displacement thereof, closes and opens connecting channels between an accumulator which supplies a primary pressure and a brake, as well as between the brake and an unpressurized fluid collection tank. The control piston 2 cooperates with a balance beam and with a measurement piston 3 to determine and detect the instantaneous brake pressure and to feed this pressure back to the control piston 2, the degree of feedback being determined by the lever ratio of the balance beam. Along the force axis of the control piston 2, a stop 17 is provided which limits the stroke of the piston, thus preventing the overloading of the balance beam 14 with abnormally high forces which occur, for instance, during panic braking.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A brake valve, comprising:

a housing;

a balance arm supported in the housing and having first and second ends which are pivotable about a fulcrum member which abuts the balance arm;

a control piston mounted to slide in the housing and engaging the first end of the balance arm so as to pivot the first end of the balance arm in response to a master pressure which may be applied to the control piston, the control piston defining a flow path for connecting a source of primary pressure to a brake when the control piston has slid sufficiently to pivot the first end of the balance arm to a predetermined degree;

a measurement piston mounted to slide in the housing and engaging the second end of the balance arm, the measurement piston being coupled by a brake fluid channel to the brake, the measurement piston being operative to pivot the second end of the balance arm to counter the sliding motion of the control piston in response to a braking pressure supplied to the measurement piston from the brake through the fluid channel, so that a mechanical advantage ratio between the braking pressure and the master pressure is established by the balance arm and so that when the braking pressure reaches a predetermined value related to the mechanical advantage ratio, the control piston is pushed back and the source of primary pressure is disconnected from the brake;

a stop member located in the path of the control piston to limit the maximum displacement thereof so that an excessive master pressure applied to the control piston is taken up by the stop member; and means for moving the fulcrum over the balance arm to permit adjustment to the mechanical advantage ratio.

2. A brake valve as in claim 1 in which the fulcrum member comprises a ball bearing and means for moving the ball bearing along the balance arm.

3. A brake valve as in claim 1 in which the housing comprises a first borehole and the control piston is slidingly mounted in the first borehole and further comprising a second borehole located generally in parallel to and spaced from the first borehole and wherein the measurement piston is located in the second borehole.

4. A brake valve as in claim 3 in which the housing comprises a plurality of channels which extend between the first and second borehole which are adapted for carrying brake fluid between the first and second borehole.

5. A brake valve comprising:

a housing;

a balance arm supported in the housing and having first and second ends which are pivotable about a fulcrum member which abuts the balance arm;

a control piston mounted to slide in the housing and to pivot the first end of the balance arm in response to a master pressure which may be applied thereto, the control piston including means for connecting a source of primary pressure to a brake when the control piston slides sufficiently to pivot the first end of the balance arm to a predetermined degree;

a measurement piston mounted to slide in the housing and coupled by a brake fluid channel to the brake, the measurement piston being operative to pivot the second end of the balance arm to counter the sliding motion of the control piston in response to a braking pressure supplied thereto from the brake through the fluid channel, so that a mechanical advantage ratio between the braking pressure and the master pressure is established by the balance arm and so that when the braking pressure reaches a predetermined value related to the mechanical advantage ratio, the control piston is pushed back and the source of primary pressure is disconnected from the brake;

a stop member located in the path of the control piston to limit the maximum displacement thereof so that an excessive master pressure applied to the control piston is taken up by the stop member;

means for moving the fulcrum member over the balance arm to permit adjustment to the mechanical advantage ratio; and a parking-brake piston slidingly supported in the housing and movable to open and close connection lines including a first connection line from the source of primary pressure to the brake and a second connection line from the brake to a brake fluid collection tank, and a displacement device for moving the parking-brake piston to a first position to open the first connection line and close the second connection line and to a second position to close the first connection line and open the second connection line.

6. A brake valve as in claim 5 in which the displacement device comprises a pressure-intensification piston which is mounted in the housing to apply forces to the parking-brake piston, a spring for applying a pressure to the pressure-intensification piston to force it against the parking-brake piston, and a control spring mounted to the parking-brake piston to retain the parking-brake piston against the pressure-intensification piston.

7. A brake valve as in claim 6 including means for adjusting of the tension in the spring.

8. A brake valve as in claim 7 in which the means for adjusting the pressure in the spring comprises a manually actuable eccentric shaft.

9. A brake valve as in claim 6 in which the pressure-intensification piston is coupled to the brake through the brake fluid channel, the braking pressure acting on the pressure-intensification piston to assume an equilibrium position which is determined by the net forces between forces exerted by the spring and the braking pressure and including means in the parking-brake piston for opening and closing the first and second connection lines so that a final braking pressure develops in the brake which is proportional to the tension set in the spring.

10. A brake valve as in claim 9 wherein in the equilibrium position of the pressure-intensification piston the parking-brake piston interrupts the connection between pressure source tank and the brake.

11. A brake valve as in claim 6 further comprising a pull rod rigidly connected to the pressure-intensification piston, the pull rod being actuatable to change the position of the parking-brake piston to open the second connection line whereby the braking pressure in the brake is relieved, the pull rod being releasable to return to its initial position whereby the parking-brake piston reestablishes an initial braking pressure in the brake determined by the initial tension of the spring.

12. A brake valve as in claim 6 wherein the parking-brake piston and the pressure-intensification piston are coaxial with one another and wherein one end of the control spring is supported against the measurement piston.

13. A brake valve as in claim 5 in which the fulcrum member comprises a ball bearing and means for moving the ball bearing along the balance arm.

14. A brake valve as in claim 5 in which the housing comprises a first borehole and the control piston is slidingly mounted in the first borehole and further comprising a second borehole located generally in parallel to and spaced from the first borehole and wherein the measurement piston is located in the second borehole.

15. A brake valve as in claim 14 in which the housing comprises a plurality of channels which extend between the first and second borehole which are adapted for carrying brake fluid between the first and second borehole.

* * * * *